(12) United States Patent
Esparza et al.

(10) Patent No.: US 11,155,246 B2
(45) Date of Patent: Oct. 26, 2021

(54) SYSTEM AND METHOD FOR MOVING A VEHICLE

(71) Applicant: Bakslyder LLC, Boulder City, NV (US)

(72) Inventors: Sonny John Esparza, Baldwin Park, CA (US); Jesse Gutierrez Veliz, Pasadena, CA (US)

(73) Assignee: BAKSLYDER LLC, Boulder City, NV (US)

( * ) Notice: Subject to any disclaimer, the term of this patent is extended or adjusted under 35 U.S.C. 154(b) by 0 days.

(21) Appl. No.: 17/217,210

(22) Filed: Mar. 30, 2021

(65) Prior Publication Data

US 2021/0300305 A1 Sep. 30, 2021

Related U.S. Application Data

(60) Provisional application No. 63/003,239, filed on Mar. 31, 2020.

(51) Int. Cl.
*B60S 13/00* (2006.01)
*B60P 3/077* (2006.01)

(52) U.S. Cl.
CPC ............... *B60S 13/00* (2013.01); *B60P 3/077* (2013.01)

(58) Field of Classification Search
CPC .................................. B60S 13/00; B60P 3/077
See application file for complete search history.

(56) References Cited

U.S. PATENT DOCUMENTS

| 4,269,426 | A | * | 5/1981 | Bhushan | B62D 53/0871 |
| | | | | | 116/32 |
| 4,968,210 | A | * | 11/1990 | Friederich | B60P 3/07 |
| | | | | | 280/402 |
| 5,302,063 | A | * | 4/1994 | Winsor | B60P 3/077 |
| | | | | | 188/32 |
| 5,380,141 | A | | 1/1995 | Flowers | |
| 5,556,249 | A | * | 9/1996 | Heine | B60P 1/6454 |
| | | | | | 414/477 |
| 5,620,296 | A | * | 4/1997 | McMahon | B60P 1/6463 |
| | | | | | 414/462 |
| 5,934,725 | A | | 8/1999 | Bowers | |
| 6,099,232 | A | | 8/2000 | Dixon et al. | |
| 6,190,106 | B1 | | 2/2001 | Richardson et al. | |
| 6,767,171 | B2 | | 7/2004 | Kelly | |
| 7,033,119 | B2 | * | 4/2006 | Baker | B60P 3/06 |
| | | | | | 410/30 |
| 9,409,526 | B2 | * | 8/2016 | Giamatti | B60R 9/042 |
| 9,550,442 | B2 | * | 1/2017 | Hanson, Jr. | B60P 1/6454 |

(Continued)

FOREIGN PATENT DOCUMENTS

| CN | 106427747 | 2/2017 |
| CN | 107351751 | 11/2017 |

(Continued)

OTHER PUBLICATIONS

International Search Report and Written Opinion, dated Jun. 29, 2021, pp. 1-11.

*Primary Examiner* — Saul Rodriguez
*Assistant Examiner* — Ashley K Romano
(74) *Attorney, Agent, or Firm* — Karish & Bjorgum, PC (57) ABSTRACT

A system for moving a vehicle having a harness; at least one front skid removably couplable to the harness; and at least one rear skid removably couplable to the at least one front skid.

18 Claims, 6 Drawing Sheets

(56) References Cited

U.S. PATENT DOCUMENTS

| | | | | |
|---|---|---|---|---|
| 9,714,585 | B2* | 7/2017 | Morey | B62B 3/02 |
| 9,718,390 | B1* | 8/2017 | Hadley | B60P 1/025 |
| 10,358,073 | B2* | 7/2019 | Lai | B60P 1/4407 |
| 10,399,477 | B2* | 9/2019 | Obermeyer | B60P 1/4457 |
| 10,589,655 | B2* | 3/2020 | Guido | B60P 1/6427 |
| 10,654,395 | B1* | 5/2020 | White | B60P 3/035 |
| 10,654,396 | B2* | 5/2020 | Dees | B62B 3/04 |
| 2002/0119035 | A1* | 8/2002 | Hamilton | B62B 5/0083 |
| | | | | 414/426 |
| 2005/0017470 | A1 | 1/2005 | Abbott | |
| 2005/0036869 | A1 | 2/2005 | Negranti | |
| 2005/0042056 | A1* | 2/2005 | Anderson | B60P 3/077 |
| | | | | 410/30 |
| 2005/0254915 | A1* | 11/2005 | Winsor | B60P 3/077 |
| | | | | 410/30 |
| 2006/0182508 | A1* | 8/2006 | Clive-Smith | B65D 88/121 |
| | | | | 410/3 |
| 2014/0360105 | A1* | 12/2014 | Trout | B60P 3/34 |
| | | | | 52/79.5 |
| 2016/0121779 | A1* | 5/2016 | Cencer | B60P 3/075 |
| | | | | 410/3 |
| 2016/0272229 | A1* | 9/2016 | Buckner | B62B 5/0003 |
| 2017/0036588 | A1 | 2/2017 | Nicolas Gil | |
| 2017/0291623 | A1 | 10/2017 | Dees | |
| 2018/0201174 | A1* | 7/2018 | Larsen | B62B 5/0093 |

FOREIGN PATENT DOCUMENTS

| | | |
|---|---|---|
| JP | 2019123287 | 7/2019 |
| KR | 200293763 | 11/2002 |
| WO | 2015132430 | 9/2015 |

* cited by examiner fig.1

SYSTEM AND METHOD FOR MOVING A VEHICLE

CROSS-REFERENCE TO RELATED APPLICATION

This application claims priority of U.S. Provisional Patent Application No. 63/003,239, entitled SYSTEM AND METHOD FOR MOVING A VEHICLE, filed on Mar. 31, 2020, the entire contents of which is hereby incorporated herein by reference.

BACKGROUND

Typically, disabled vehicles in need of towing, such as cars and trucks, are placed in neutral and pulled up onto a flatbed tow truck using a winch coupled to the vehicle. However, some vehicles cannot be placed into neutral once they are disabled. Those vehicles cannot be easily pulled onto a flatbed tow truck without damage to the vehicle.

Accordingly, there exists a need for an improved method and system for moving a disabled vehicle onto a flatbed tow truck that remedies the shortcomings of the prior art.

SUMMARY

Embodiments of the present invention include a system for moving a vehicle comprising: a harness; at least one front skid removably couplable to the harness; and at least one rear skid removably couplable to the at least one front skid. In an embodiment, the system has a first front skid and a second front skid; a first rear skid and a second rear skid; and wherein the first rear skid is removably couplable to the first front skid and the second rear skid is removably couplable to the second front skid.

In an embodiment, the harness further comprises at least one skid connection point; the at least one front skid further comprises a harness connection point; and the harness connection point is removably coupled to the skid connection point. In an embodiment, the at least one front skid further has a rear skid connection point; the at least one rear skid has a front skid connection point; and the rear skid is removably couplable to the front skid using at least one of a cable, chain and strap connected between the front skid connection point and the rear skid connection point.

In an embodiment, the at least one front skid and the at least one rear skid each have a body and a lip; and the lip is angled between about 15 degrees and about 75 degrees relative to the body. Optionally, the at least one front skid and the at least one rear skid each have a rear stay configured to prevent a wheel of a towed vehicle from rolling rearward off of the skid. Optionally, the at least one front skid and the at least one rear skid may each have a front stay configured to prevent a wheel of a towed vehicle from rolling forward off of the skid.

In an embodiment, the at least one front skid and the at least one rear skid each have a sidewall. The at least one front skid and the at least one rear skid may each have at least one anchor. Additionally, the at least one front skid and the at least one rear skid may each have a plastic boot fastened to an underside of the body.

In an embodiment, the harness has first and second upper sides, connected to each other at a first end; and a cross bar connected to second ends of the first and second upper sides to form a triangle. In another embodiment, the harness has a crossbar; a first harness connection plate movably coupleable to the crossbar, the first harness connection plate having a skid connection point and a first winch connector; and a second harness connection plate movably coupled to the crossbar, the second harness connection plate having a skid connection point and a second winch connector; and a winch connection point removably coupled to the first winch connector by at least one of a cable, chain and strap and removably coupled to the second winch connector by at least one of a cable, chain and strap.

The crossbar may be formed of box steel and may have a plurality of holes. The first harness connection plate and the second harness connection plate may be coupled to the crossbar using fasteners that extend through the crossbar holes. In an embodiment, the first harness connection plate has an angle of between about 30 degrees and about 80 degrees relative to the crossbar; and the second harness connection plate has an angle of between about 100 degrees and about 150 degrees relative to the crossbar.

The present invention, according to an embodiment, is also directed to a method for moving a vehicle comprising the steps of: obtaining a system for moving a vehicle comprising: a harness; two front skids; and two rear skids; raising a first side of the vehicle such that tires on the first side of the vehicle are off the ground and placing front skids and rear skids under the raised tires; raising a second side of the vehicle such that tires on the second side of the vehicle are off the ground and placing front skids and rear skids under the raised tires; removably connecting the front skids to the harness; and removably connecting each of the rear skids to a separate one of the front skids.

The method may further comprise the step of removably coupling at least one front wheel of the vehicle to at least one front skid or removably coupling at least one rear wheel of the vehicle to at least one rear skid. The method may further comprise the steps of removably coupling a winch to the harness and pulling the harness, the front wheel skids, the rear wheel skids and the vehicle on the skids onto a tow truck. Optionally, the method further comprises the step of removably coupling at least one front wheel or front wheel skid to the tow truck or removably coupling at least one rear wheel or rear wheel skid to the tow truck.

The present invention, according to an embodiment is also directed to a system for moving a vehicle having, the system having: a harness having: a crossbar; a first harness plate coupleable to the crossbar, the first harness plate having a first winch connector and a skid connection point; a second harness plate coupleable to the crossbar, the second harness plate having a second winch connector and a skid connection point; and a winch connection point removably coupled to the first winch connector by at least one of a cable, chain and strap and removably coupled to the second winch connector by at least one of a cable, chain and strap. The system also has a first front skid further comprising a harness connection point and a rear skid connection point, the harness connection point being removably coupled to the skid connection point of the first harness plate; a second front skid further comprising a harness connection point and a rear skid connection point, the harness connection point being removably coupled to the skid connection point of the second harness plate; a first rear skid further comprising a front skid connection point removably couplable to the rear skid connection point of the first front skid; and a second rear skid further comprising a front skid connection point removably couplable to the rear skid connection point of the second front skid.

These and other features of the invention should become apparent to those skilled in the art from the following description of the preferred embodiments taken in conjunction with the accompanying drawings, which illustrate, by way of example, the principles of the invention, the invention not being limited to any particular preferred embodiment(s) disclosed.

BRIEF DESCRIPTION OF THE DRAWINGS

These and other features, aspects, and advantages of the present invention will become better understood with reference to the following description, appended claims, and accompanying drawings where:

DETAILED DESCRIPTION

In the following description of the preferred embodiments, reference is made to the accompanying drawings which show by way of illustration specific embodiments in which the invention may be practiced. Wherever possible, the same reference numbers are used throughout the drawings to refer to the same or like parts. It is to be understood that other embodiments may be utilized, and structural and functional changes may be made, without departing from the scope of the present invention.

Referring to FIGS. 1 through 8, embodiments of a system for moving a disabled vehicle 10 will now be described. The system 10 is intended for moving a vehicle, such as a four wheeled car or truck onto a flatbed tow truck. As will be understood by those of skill in the art, the invention may be used to move other types of vehicles, such as ATV's or other multi-wheeled vehicles. A typical flatbed tow truck is equipped with a winch 12. The system 10 of the present invention has a harness 14 that is connectable to the winch 12. Front wheel skids 16A and 16B are removably attachable to the harness 14. Rear wheel skids 18A and 18B are removably attachable to the front wheel skids 16A and 16B respectively.

Figure 1:
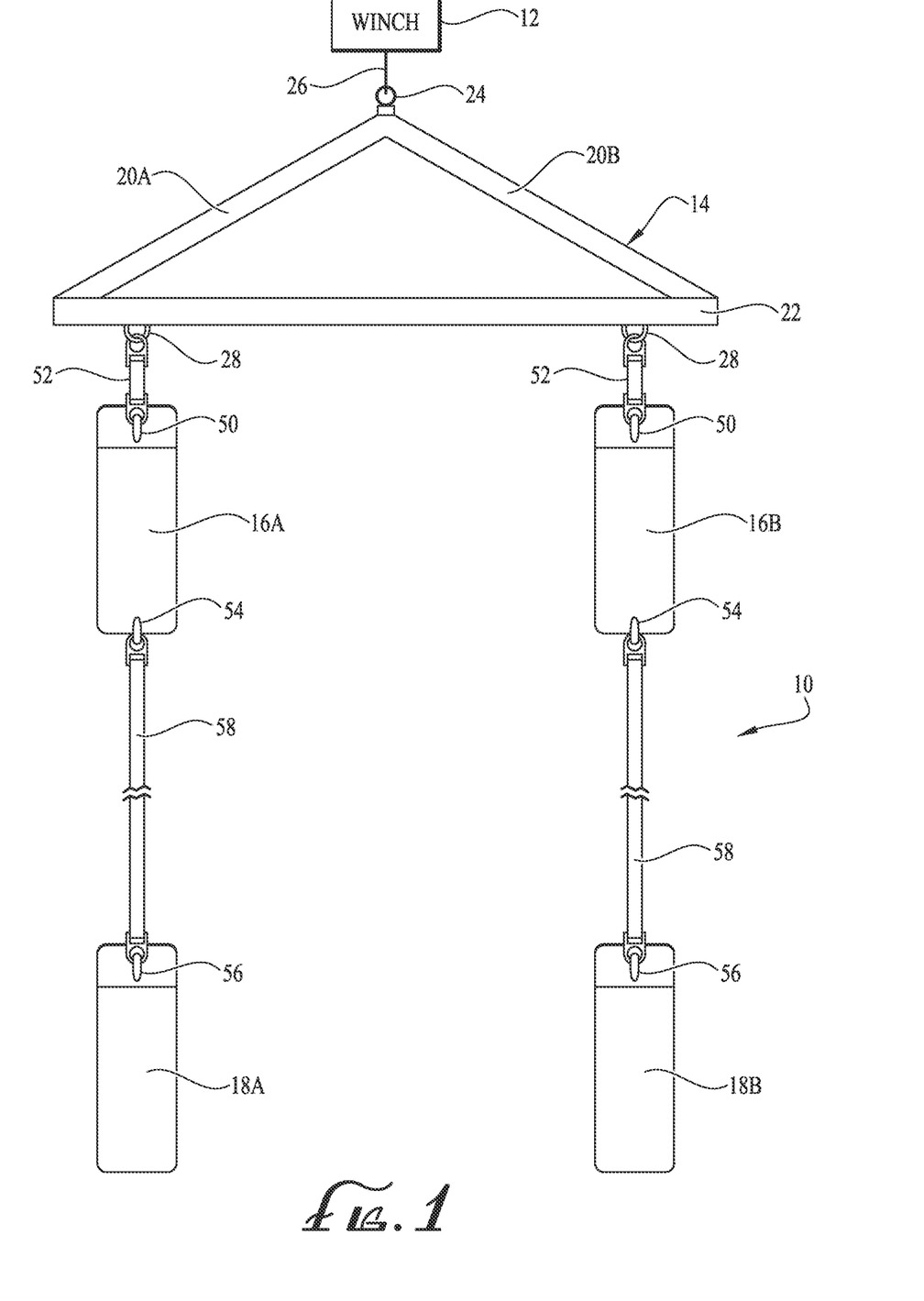
FIG. 1 is a schematic diagram of a system for moving a vehicle according to an embodiment of the present invention.
Figure 2:
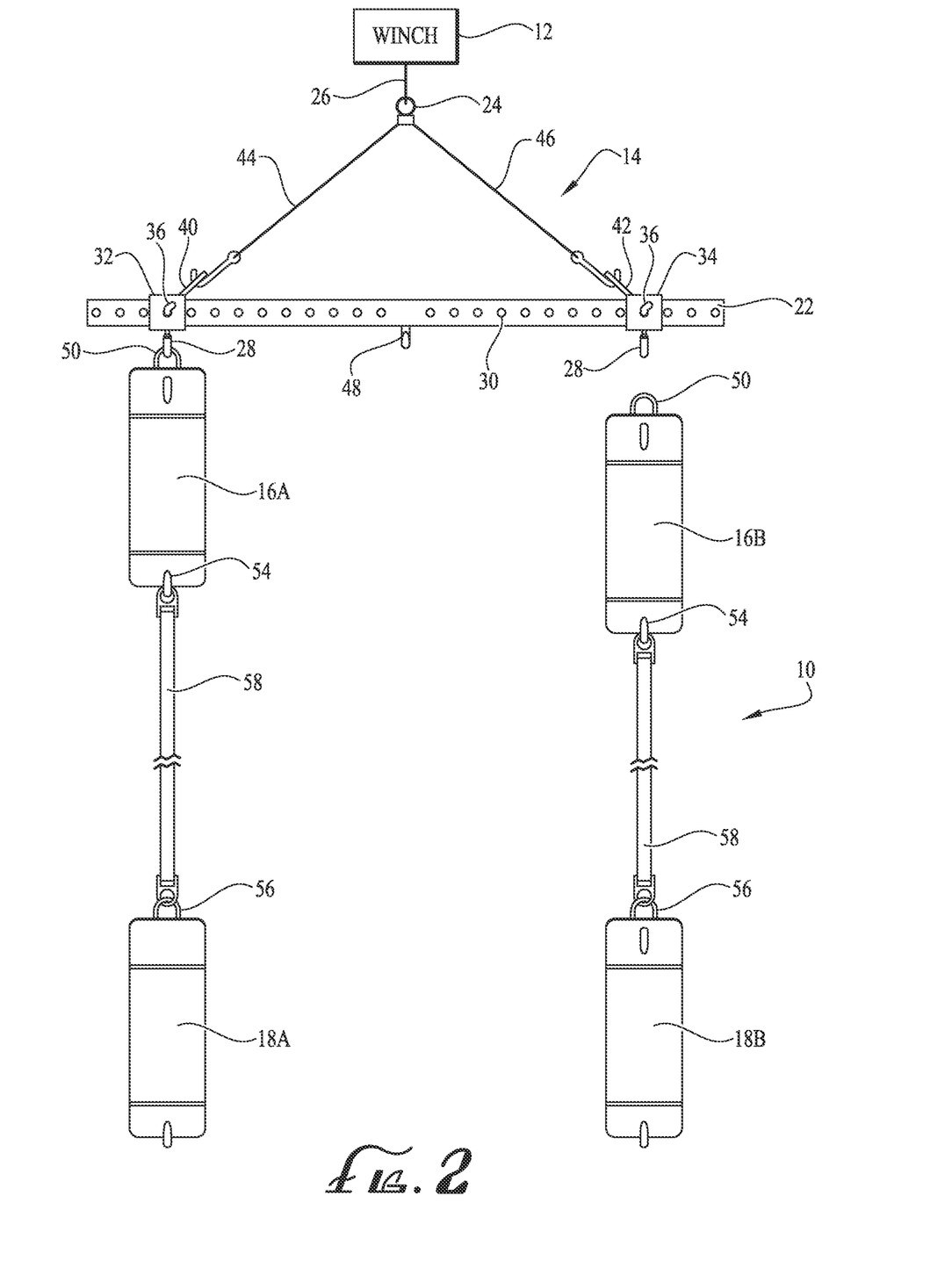
FIG. 2 is a schematic diagram of a system for moving a vehicle according to an additional embodiment of the present invention.

Referring to FIGS. 1 and 2, the harness 14 is configured to pull the weight of the vehicle to be towed up onto the bed of a tow truck without bending or breaking. In a first embodiment as shown in FIG. 1, the harness 14 is formed of box steel into a triangle having two upper sides 20A and 20B connected to each other at a first end, and connected by a crossbar 22 at a second end. In additional embodiments, additional support bars may be placed between the upper sides 20A and 20B and the crossbar 22. Proximal to the point where the two upper sides 20A and 20B are connected is a winch connection point 24 for connecting the harness 14 to the winch 12. The winch connection point 24 may be, for example a loop, hook or latch coupled to the harness 14, such as by welding, for connecting a cable, chain or strap between the harness and the winch. The winch connection point 24 may also be, for example, one or more holes or slots.

The crossbar 22 has skid connection points 28 for connecting the front wheel skids 16A and 16B. The skid connection points 28 may be, for example, loops, hooks or latches coupled to the crossbar 22 such as by welding. Additionally, the skid connection points 28 may be holes or slots. Preferably, the crossbar 22 has more than two skid connection points 28 to allow for variable connection of the front wheel skids 16a and 16b to accommodate vehicles with different wheelbases.

In an additional embodiment, as shown in FIG. 2, the harness 14 has a crossbar 22. The crossbar 22 may be formed of box steel. The crossbar 22 has a plurality of holes 30. A first harness connection plate 32 and a second harness connection plate 34 are movably coupleable to the crossbar 22 using fasteners 36 that extend through the crossbar holes 30. The first harness plate 32 and the second harness plate 34 have skid connection points 28.

The first harness plate 32 has a first winch connector 40. The second harness plate 34 has a second winch connector 42. The first winch connector 40 is connected to the winch connection point 24 by a first cable, chain or strap 44. The second winch connector 42 is connected to the winch connection point 24 by a second cable, chain or strap 46.

In an embodiment, the first and second winch connectors 40, 42 are angled for strength. The first winch connector 40 is angled between about 30 degrees and about 80 degrees, and more preferably between about 45 degrees and about 55 degrees, relative to the cross bar. The second winch connector 42 is angled between about 100 degrees about 150 degrees, and more preferably between about 135 degrees and about 145 degrees, relative to the cross bar. The cross bar 22 may have at least one fastener connecting point 48 for connecting other fasteners, such as wheel tie downs. In an embodiment, the harness connection plates 32, 34 are configured so that the crossbar slides along an edge as the system 10 is used to move a vehicle to reduce friction.

With further reference to FIGS. 1 to 8, each of the front wheel skids 16A and 16B have a harness connection point 50. The harness connection point 50 may be, for example, a loop, hook or latch coupled to the front wheel skid such as by welding. Additionally, the harness connection point 50 may be a hole or a slot. A connector 52, such as a cable, chain or strap is removeably connected between the skid connection point 28 and the harness connection point 50 to removably connect each front wheel skid to the crossbar 22. In an embodiment, the front wheel skid connection point 28 is connected directly to the harness connection point 50.

Each of the front wheel skids 16A and 16B has a rear wheel skid connection point 54. The rear wheel skid connection point 54 may be, for example, a loop, hook or latch coupled to the front wheel skid such as by welding. Additionally, the rear wheel skid connection point 54 may be a hole or a slot.

Each of the rear wheel skids 18A and 18B has a front skid connection point 56. The connection point 56 may be, for example, a loop, hook or latch coupled to the rear wheel skid such as by welding. Additionally, the connection point 56 may be a hole or a slot. A skid connector 58, such as a cable, chain or strap is removably connected between the rear wheel skid connection point 54 on the front wheel skid and the front skid connection point 56 on the rear wheel skid to removably connect each front wheel skid to a separate rear wheel skid.

Additional details of the skids 16A, 16B, 18A and 18B will now be discussed with reference to FIGS. 3 to 8. In an embodiment, each skid has a body 60 with an angled lip 62 on the front of the skid. The angle of the lip 62 is preferably between about 15 degrees to about 75 degrees and more preferably between about 30 degrees and about 60 degrees. Preferably, the lip 62 is configured to assist the skid in traveling onto an edge of a flatbed tow truck. The lip 62 may also be configured to prevent a wheel of a towed vehicle from rolling forward off of the skid.

Figure 3:
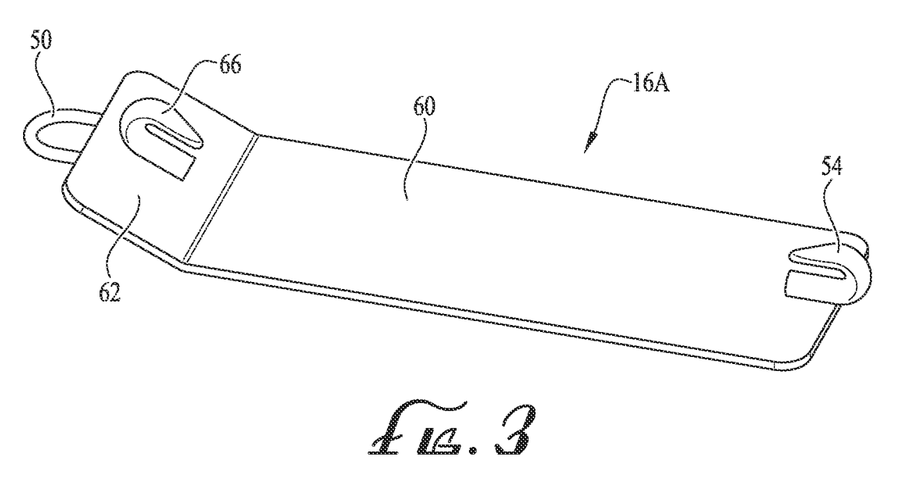
FIG. 3 is a side perspective elevation view of a wheel skid according to an embodiment of the present invention that is usable in the systems for moving a vehicle of FIGS. 1 and 2.
Figure 4:
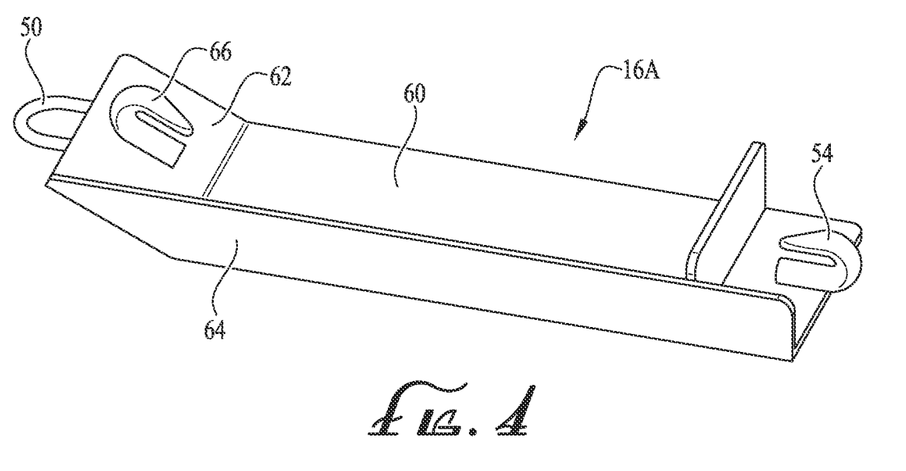
FIG. 4 is a side perspective elevation view of a wheel skid according to an embodiment of the present invention that is usable in the systems for moving a vehicle of FIGS. 1 and 2.

In an embodiment, as shown in FIG. 4, the skid has a sidewall 64. The sidewall 64 may be configured to increase the rigidity of the skid. Additionally, as shown in FIGS. 3 and 4, the skid may have a plurality of anchors 66, such as holes, loops, and hooks, for connection of chains, cables or straps, such as for attaching a tire to the skid, attaching the skid to a tow truck, or for attaching a tool such as a winch to manipulate the skid. For example, the skid may have four anchors 66, with an anchor positioned proximal to each corner of the body 60.

Figure 5:
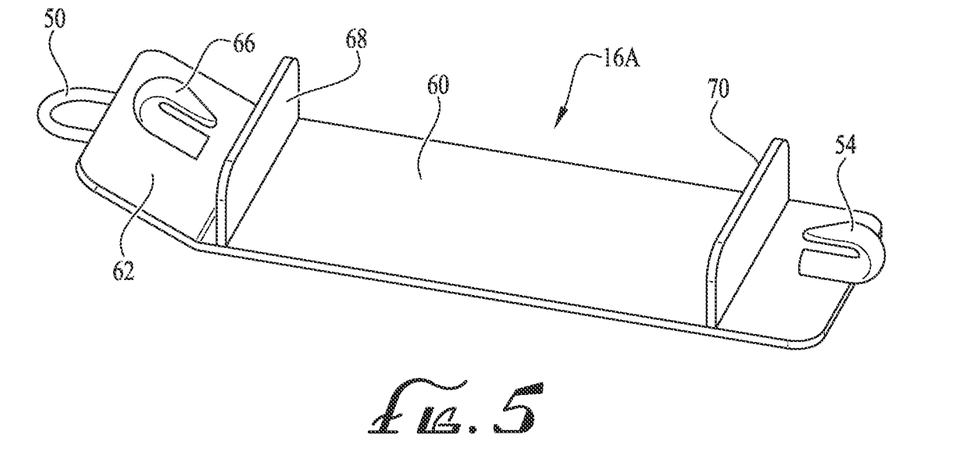
FIG. 5 is a side perspective elevation view of a wheel skid according to an embodiment of the present invention that is usable in the systems for moving a vehicle of FIGS. 1 and 2.
Figure 6:
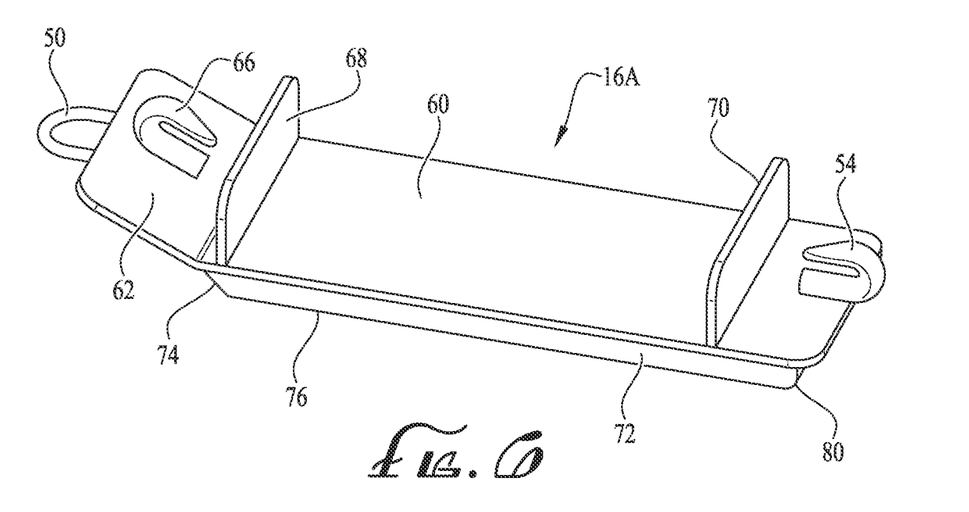
FIG. 6 is a side perspective elevation view of a wheel skid according to an embodiment of the present invention that is usable in the systems for moving a vehicle of FIGS. 1 and 2.

In an embodiment, as shown in FIG. 5, the skid has a front stay 68. The front stay 68 is at an angle relative to the body 60 and is configured to prevent a wheel of a towed vehicle from rolling forward off of the skid. In an embodiment, the front stay 68 is angled between about 15 degrees and about 115 degrees and more preferably between about 75 degrees and about 90 degrees.

In an embodiment, as shown in FIG. 5, the skid has a rear stay 70. The rear stay 70 is at an angle relative to the body 60 and is configured to prevent a wheel of a towed vehicle from rolling rearward off of the skid. In an embodiment, the rear stay 70 is angled between about 15 degrees and about 115 degrees and more preferably between about 75 degrees and about 60 degrees. The rear stay 70 may also be configured to assist the skid in traveling off of an edge of a flatbed tow truck and onto the ground. The harness connection point 50 may be located, for example, on the lip 62 or on the front stay 68. The rear wheel skid connection point 54 may be located, for example, on the body 60 or on the rear stay 70.

Although FIGS. 3 to 8 have been used to illustrate a front skid 16A, 16B, the front and rear skids may be interchangeable. When used as a rear skid, the harness connection point 50 functions as the front skid connection point 56. Additionally, a rear skid 18A, 18B may be configured similarly to a front skid, such as with a front lip, front stay and rear stay, but without a rear wheel skid connection point 34.

The front skids 16A, 16B and the rear skids 18A, 18B may be made from steel plate. In an embodiment, a top surface of the body 60 may be textured such as, for example, with diamond plate, to increase traction. Alternatively, the skids may be made from, for example, stainless steel or aluminum, or other materials sufficient to support the weight of the vehicle. In an embodiment, different materials are used for the skids depending on the weight of the vehicle to be towed. This may allow for the use of thinner metal plates or lighter materials in certain instances, which may aid a tow truck operator or other user in using the system of the present invention.

Figure 7:
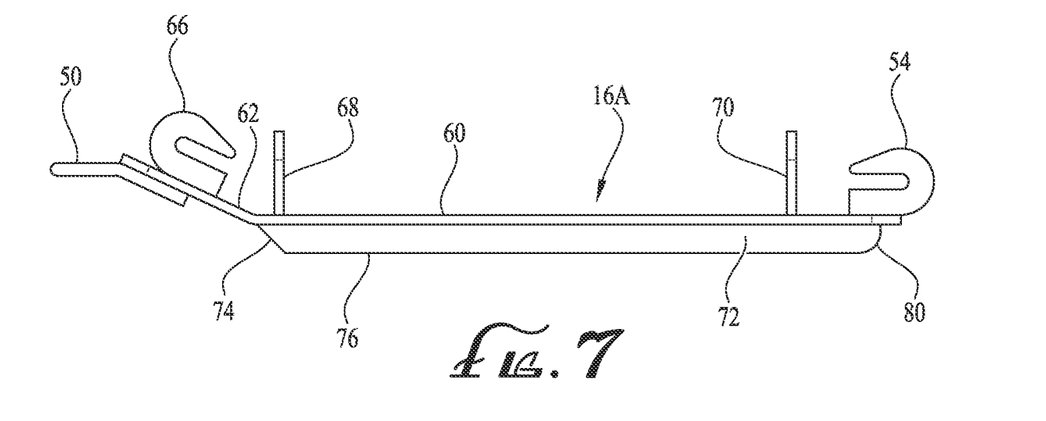
FIG. 7 is a side elevation view of a wheel skid according to an embodiment of the present invention that is usable in the systems for moving a vehicle of FIGS. 1 and 2.
Figure 8:
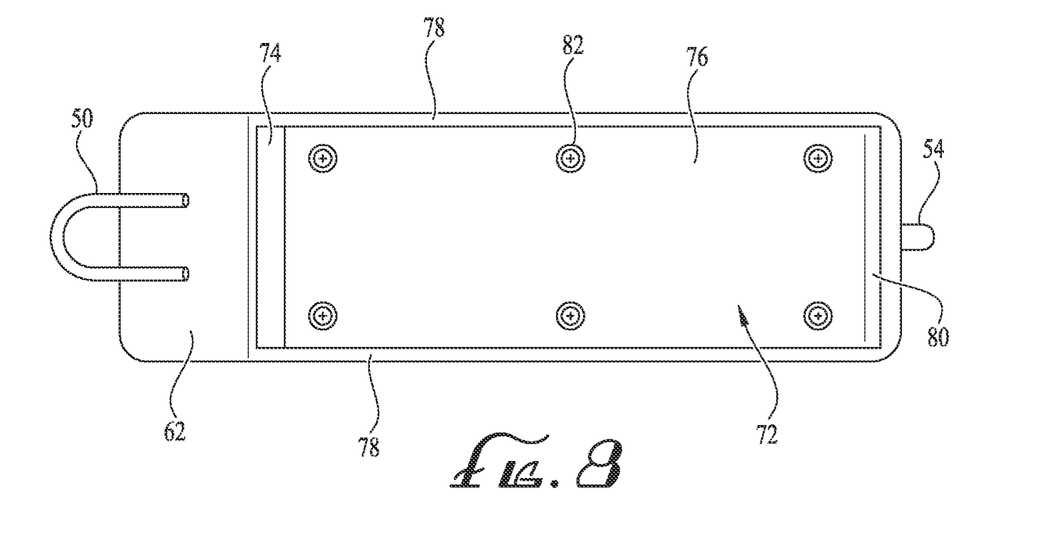
FIG. 8 is a bottom elevation view of the wheel skid of FIG. 7.

In an additional embodiment, as shown in FIGS. 7 and 8, a removable plastic boot 72 may be placed over the bottom of the skid so that the skids do not mark up a street or driveway when a towed vehicle is pulled onto a tow truck. The boot 72 may also decrease friction to make it easier to move the vehicle. The boot 72 may have a front edge 74 that is angled relative to a bottom surface 76 of the boot. The angle of the front edge 74 may be from about 15 degrees to about 75 degrees and more preferably from about 30 to about 60 degrees. Additionally, the boot 72 may have rounded side edges 78 and a rounded rear edge 80 to ease sliding of the skid over bumps, such as, for example, road imperfections and a tow truck bed edge. The front edge 74 may also be rounded rather than angled. The boot 72 may be removably attached to the skid by a plurality of fasteners 82. In an embodiment, the fasteners are countersunk into the boot 72 to avoid the fasteners scratching a street or driveway.

Additionally, a third set of skids may be used for towing vehicles with tandem front or rear wheels. The third set of skids would attach to the rear skids in the same manner as the rear skids are attached to the front skids. Additionally, differently sized skids may be used to accommodate vehicles with differently sized rear tires. Extra wide rear skids may be used to tow vehicles with dual rear wheels.

Figure 9:
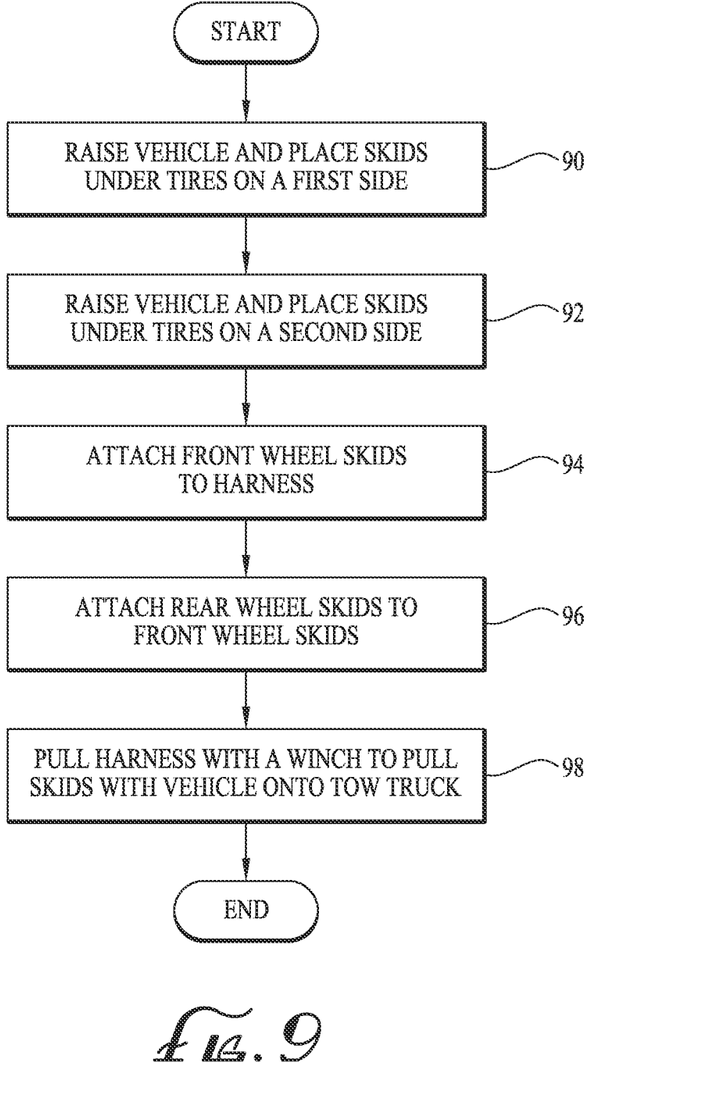
FIG. 9 is a flowchart of a method for moving a disabled vehicle according to an embodiment of the present invention; and Unless otherwise indicated, the illustrations in the above figures are not necessarily drawn to scale.

Referring to FIG. 9, an embodiment of a method for moving a vehicle will now be described. Once a vehicle or other item to be towed is located, the system of the present invention is used to place that vehicle or other item onto the bed of a flatbed tow truck. As will be understood by those of skill in the art, the system of the present invention may also be used to move a vehicle from a first location, such as in a lane of traffic, to a second location, such as a shoulder of a freeway.

Initially, a first side of a vehicle is raised using a jack and front and rear skids are placed under the raised tires on the first side of the vehicle, Box 90. A second side of a vehicle is then raised using a jack and front and rear skids are placed under the raised tires on the second side of the vehicle, Box 92. The front wheel skids 16A, 16B are coupled to the harness 14, Box 94. The front wheel skids 16A, 16B may be directly coupled to the harness 14 or may be coupled to the harness 14 using connectors 52, such as chains, cables or straps. The rear wheel skids 18A, 18B are coupled to the front wheel skids 16A, 16B respectively, Box 96. A winch may then be used to pull the harness 14, as well as the attached front skids 16A, 16B, rear skids 18A and 18B and the vehicle itself onto a tow truck, Box 98.

Instead of raising the vehicle from side to side, the front of the vehicle may be raised with a jack and the front skids 16A, 16B placed under the front tires. The rear of the vehicle may be raised with a jack and the rear skids 18A, 18B placed under the rear tires. The remainder of the procedure may remain the same.

Additionally, the method for moving a vehicle may have the step of further securing one or more of the vehicle tires to one or more of the front skids or rear skids. Additionally, if some of the vehicle tires may freely rotate, it may not be necessary to use a skid on all of the wheels. Additionally, the method for moving a vehicle may have the step of further securing one or more of the vehicle tires or skids to a tow truck.

The system and method of the present invention are advantageous in that they allow for moving vehicles that cannot be rolled onto the bed of a tow truck without damage to the vehicle.

All features disclosed in the specification, including the claims, abstract, and drawings, and all of the steps in any method or process disclosed, may be combined in any combination, except combinations where at least some of the features and/or steps are mutually exclusive. Each feature disclosed in the specification, including the claims, abstract, and drawings, can be replaced by alternative features serving the same, equivalent, or similar purpose, unless expressly stated otherwise. Thus, unless expressly stated otherwise, each feature disclosed is one example only of a generic series of equivalent or similar features. Any element in a claim that does not explicitly state "means" for performing a specified function or "step" for performing a specified function, should not be interpreted as a "means" or "step" clause as specified in 35 U.S.C. § 112.

There is disclosed in the above description and the drawings, a system and method for moving a vehicle that fully and effectively overcomes the disadvantages associated with the prior art. However, it will be apparent that variations and modifications of the disclosed embodiments may be made without departing from the principles of the invention. The foregoing detailed description of the present invention is provided for purposes of illustration, and it is not intended to be exhaustive or limit the invention to the particular embodiments disclosed. The embodiments may provide different capabilities and benefits depending on the configuration used to implement the key features of the invention. Accordingly, the scope of the invention is defined only by the following claims.

What is claimed is:

1. A system for moving a vehicle comprising:
a harness further comprising at least one skid connection point;
at least one front skid removably couplable to the harness, the at least one front skid further comprising:
a harness connection point; and
a rear skid connection point; and
at least one rear skid removably couplable to the at least one front skid, the at least one rear skid further comprising a front skid connection point;
wherein each skid is configured for sliding when pulled by the harness; the harness connection point is removably couplable to the skid connection point; and the rear skid is removably couplable to the front skid using at least one of a cable, chain and strap connected between the front skid connection point and the rear skid connection point.

2. The system of claim 1 further comprising:
a first front skid and a second front skid;
a first rear skid and a second rear skid;
wherein the first rear skid is removably couplable to the first front skid and the second rear skid is removably couplable to the second front skid.

3. The system of claim 1 wherein the at least one front skid and the at least one rear skid each further comprise a body and a lip; and wherein the lip is angled between about 15 degrees and about 75 degrees relative to the body.

4. The system of claim 3 wherein the at least one front skid and the at least one rear skid each further comprise a rear stay configured to prevent a wheel of a towed vehicle from rolling rearward off of the at least one front skid and the at least one rear skid.

5. The system of claim 3 wherein the at least one front skid and the at least one rear skid each further comprise a front stay configured to prevent a wheel of a towed vehicle from rolling forward off of the at least one front skid and the at least one rear skid.

6. The system of claim 3 wherein the at least one front skid and the at least one rear skid each further comprise a sidewall.

7. The system of claim 3 wherein the at least one front skid and the at least one rear skid each further comprise at least one anchor.

8. The system of claim 3 wherein the at least one front skid and the at least one rear skid each further comprise a plastic boot fastened to an underside of the body.

9. The system of claim 1 wherein the harness further comprises first and second upper sides, connected to each other at a first end; and a cross bar connected to second ends of the first and second upper sides to form a triangle.

10. A system for moving a vehicle comprising:
a harness;
at least one front skid removably couplable to the harness; and
at least one rear skid removably couplable to the at least one front skid;
wherein the harness further comprises:
a crossbar;
a first harness connection plate movably coupleable to the crossbar, the first harness connection plate further comprising a skid connection point and a first winch connector; and
a second harness connection plate movably coupled to the crossbar, the second harness connection plate further comprising a skid connection point and a second winch connector; and
a winch connection point removably coupled to the first winch connector by at least one of a cable, chain and strap and removably coupled to the second winch connector by at least one of a cable, chain and strap.

11. The system of claim 10 wherein the crossbar is formed of box steel and comprises a plurality of holes; and the first harness connection plate and the second harness connection plate are coupled to the crossbar using fasteners that extend through the crossbar holes.

12. The system of claim 10 wherein the first harness connection plate has an angle of between about 30 degrees and about 80 degrees relative to the crossbar; and the second harness connection plate has an angle of between about 100 degrees and about 150 degrees relative to the crossbar.

13. A method for moving a vehicle comprising the steps of:
obtaining a system for moving a vehicle comprising: a harness; two front skids; and two rear skids;
raising a first side of the vehicle such that tires on the first side of the vehicle are off the ground and placing front skids and rear skids under the raised tires;
raising a second side of the vehicle such that tires on the second side of the vehicle are off the ground and placing front skids and rear skids under the raised tires;
removably connecting the front skids to the harness; and
removably connecting each of the rear skids to a separate one of the front skids.

14. The method of claim 13 further comprising the step of removably coupling at least one front wheel of the vehicle to at least one front skid or removably coupling at least one rear wheel of the vehicle to at least one rear skid.

15. The method of claim 13 further comprising the step of removably coupling a winch to the harness.

16. The method of claim 15 further comprising the step of pulling the harness, the front wheel skids, the rear wheel skids and the vehicle on the skids onto a tow truck.

17. The method of claim 16 further comprising the step of removably coupling at least one front wheel or front wheel skid to the tow truck or removably coupling at least one rear wheel or rear wheel skid to the tow truck.

18. A system for moving a vehicle, the system comprising:
- a harness further comprising:
  - a crossbar;
  - a first harness plate coupleable to the crossbar, the first harness plate further comprising a first winch connector and a skid connection point;
  - a second harness plate coupleable to the crossbar, the second harness plate further comprising a second winch connector and a skid connection point; and
  - a winch connection point removably coupled to the first winch connector by at least one of a cable, chain and strap and removably coupled to the second winch connector by at least one of a cable, chain and strap;
- a first front skid further comprising a harness connection point and a rear skid connection point, the harness connection point being removably coupled to the skid connection point of the first harness plate; and
- a second front skid further comprising a harness connection point and a rear skid connection point, the harness connection point being removably coupled to the skid connection point of the second harness plate;
- a first rear skid further comprising a front skid connection point removably couplable to the rear skid connection point of the first front skid; and
- a second rear skid further comprising a front skid connection point removably couplable to the rear skid connection point of the second front skid.

* * * * *